June 28, 1927.

J. B. KERR ET AL 1,633,748

PNEUMATIC CUSHION WHEEL

Filed June 18, 1926     2 Sheets-Sheet 1

J.B.Kerr
J.R.Young
Inventors.

By C.A.Snow &Co.
Attorneys.

June 28, 1927.

J. B. KERR ET AL 1,633,748

PNEUMATIC CUSHION WHEEL

Filed June 18, 1926     2 Sheets-Sheet 2

J.B.Kerr
J.R.Young
      Inventors

By C.A.Snow & Co.
      Attorneys.

Patented June 28, 1927.

1,633,748

UNITED STATES PATENT OFFICE.

JOHN BOBBY KERR AND JACOB R. YOUNG, OF ALBUQUERQUE, NEW MEXICO.

PNEUMATIC CUSHION WHEEL.

Application filed June 18, 1926. Serial No. 116,929.

This invention relates to cushion tires and aims to provide a cushion tire construction which will have resilient qualities equal to the usual pneumatic tire now in common use.

An important object of the invention is to provide a tire of this character wherein the inner tube is eliminated, novel means being provided for pneumatically cushioning the tread of the tire from a point remote from the tire tread.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
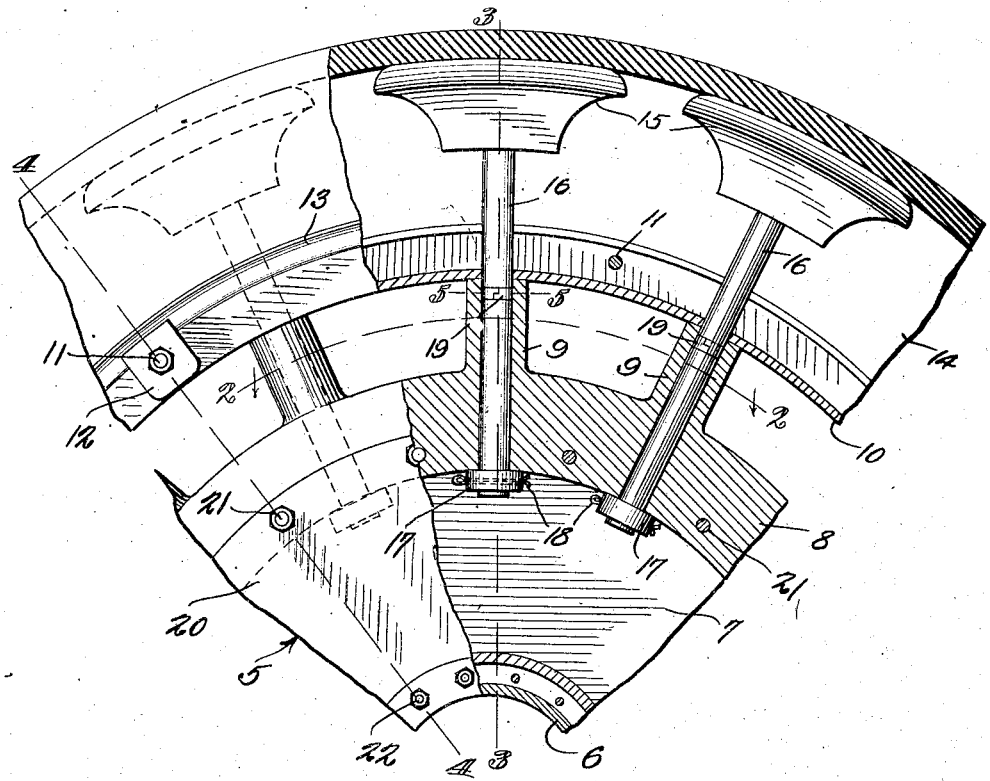
Figure 1 is a fragmental view illustrating a wheel constructed in accordance with the invention, one of the sides thereof being broken away.
Figure 2:
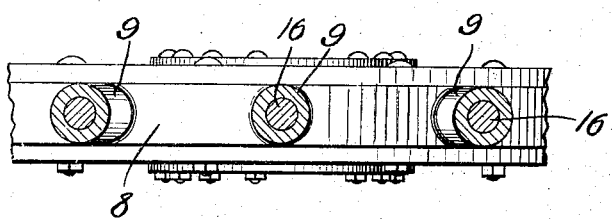
Figure 2 is a sectional view taken on line 2—2 of Figure 1.

Referring to the drawings in detail, the reference character 5 indicates the central portion of the wheel which is supplied with the usual hub 6.

Figures 3, 4:
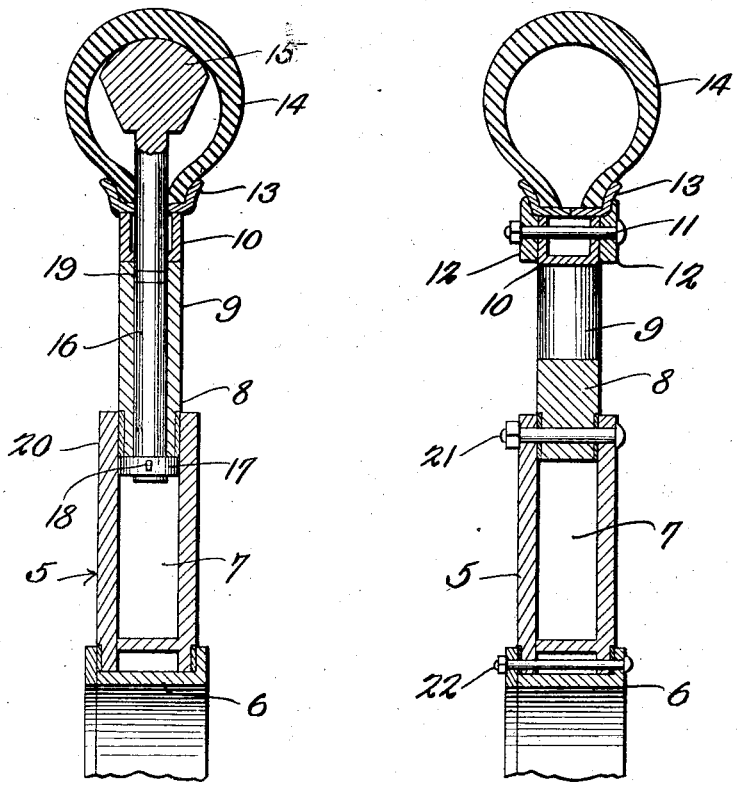
Figure 3 is a sectional view taken on line 3—3 of Figure 1.
Figure 4 is a sectional view taken on line 4—4 of Figure 1.
Figure 5:
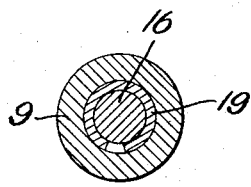
Figure 5 is a sectional view taken on line 5—5 of Figure 1.

The central section includes an air and oil chamber 7 that is surrounded by the circular member 8 that has a plurality of hollow spokes 9 extending therefrom. The felloe, which is indicated at 10 is secured to the outer ends of the spokes 9 as clearly shown by Figure 1 of the drawings, which felloe is supplied with openings to accommodate the bolts 11 that pass through the securing clips 12 arranged on opposite sides of the felloe, which clips have portions thereof extended beyond the felloe to engage the rim sections 13 as clearly shown by Figure 4.

Mounted on the rim 13 is a tire shoe 14 which is of the usual construction. Disposed within the shoe 14 are the heads 15 which are constructed to conform to the contour of the inner surface of the tire adjacent to the tread portion thereof, each head being supported at the outer end of a plunger 16, which plungers extend through the felloe 10 and through the hollow spokes 9, the inner ends of the plungers extending into the chamber 7 where they are supplied with heads 17 held to the plungers, by means of the cotter keys 18.

In order that air-tight connections will be had between the plungers 16 and the spokes, rings 19 are supplied on the plungers.

The central portion of the wheel is closed by means of the plate 20 which is secured to the wheel by means of the bolts 21 that extend through the member 8, the inner portion of the plate 20 being secured to the hub 6 by means of the bolts 22.

From the foregoing it will be obvious that due to the construction shown and described, any pressure exerted exteriorly of the shoe 14, will tend to force the head 15 and plunger 16 supporting the same, disposed adjacent to the point where pressure is exerted inwardly, forcing the head 17 thereof against the air pressure in the chamber 7.

As soon as the pressure on the exterior of the shoe 14 has been relieved, it will be obvious that the air pressure within the air chamber 7 will act to return the plunger and head 15 to its initial position. It will thus be seen that the action of the plungers against the air within chamber 7 will lend resiliency to the tire shoe equal to that of a pneumatic tire.

We claim:

In a cushion wheel, an inner hollow section having integral spokes, said spokes being hollow, the inner section having openings communicating with the hollow spokes, plates secured to the inner section and providing a housing with the inner section, plungers operating through the hollow spokes, means on the plungers for providing fluid-tight connections between the plungers and walls of the hollow spokes, heads on the inner ends of the plungers and operating between the plates, a felloe having openings, secured to the spokes, shoes on the outer ends of the plungers, a tire on the felloe and in which the shoes are positioned, and said heads operating in fluid contained in the housing to restrict movement of the plungers.

In testimony that we claim the foregoing as our own, we have hereto affixed our signatures.

JOHN BOBBY KERR.
JACOB R. YOUNG.